United States Patent [19]

Suzuki

[11] 3,913,814

[45] Oct. 21, 1975

[54] TAPE DRIVING DEVICE

[75] Inventor: Tatsuro Suzuki, Nagoya, Japan

[73] Assignee: Yupiteru Ongaku Kogyo Kabushikikaisha, Tokyo, Japan

[22] Filed: Apr. 8, 1974

[21] Appl. No.: 458,874

[30] Foreign Application Priority Data

May 4, 1973 Japan .................................. 48-52933

[52] U.S. Cl. .......................... 226/187; 242/55.19 A

[51] Int. Cl.$^2$ .......................................... B65H 17/20

[58] Field of Search ......... 226/89, 90, 91, 181, 187, 226/174, 180, 190; 360/132; 242/55.19 A

[56] References Cited

UNITED STATES PATENTS

| | | | |
|---|---|---|---|
| 3,465,940 | 9/1969 | Kuwabara | 360/132 X |
| 3,578,334 | 5/1971 | Bun | 242/55.19 A |
| 3,703,251 | 11/1972 | Suzuki | 226/90 |
| 3,726,456 | 4/1973 | Church | 226/89 |

*Primary Examiner*—Richard A. Schacher
*Attorney, Agent, or Firm*—Hill, Gross, Simpson, Van Santen, Steadman, Chiara & Simpson

[57] ABSTRACT

There is provided a tape driving device for a tape cartridge type recording and/or reproducing apparatus which comprises a cartridge guide device, a cartridge holding device which engages a groove formed on one side wall of the cartridge, when it is loaded in the apparatus in the operating position, for holding the cartridge at that position, and an arm which is pivoted from a fixed part and supports at its one end a capstan and is biased by a spring in such a direction that the capstan is normally biased to contact a pinch roller provided in the cartridge when it is loaded in the apparatus in the operating position.

6 Claims, 5 Drawing Figures

TAPE DRIVING DEVICE

BACKGROUND OF THE INVENTION

1. Field of the Invention

The present invention relates generally to a tape driving device for a tape cartridge type recording and/or reproducing apparatus, and more particularly is directed to a tape driving device for a cartridge type magnetic tape recording and/or reproducing apparatus.

2. Description of the Prior Art

In the prior art device, a tape cartridge is moved against its weight and frictional resistance, so that it requires a strong spring to provide the gripping force between a capstan and a pinch roller for positively driving a tape, and this results in great power consumption, and shortens the life span of the device, and produces a noise.

SUMMARY OF THE INVENTION

It is an object of the present invention to provide a tape driving device for a tape cartridge type recording and/or reproducing apparatus free from the defects encountered in the prior art.

It is another object of the invention to provide a tape driving device for a tape cartridge type recording and/or reproducing apparatus which has less power consumption.

It is a further object of the invention to provide a tape driving device for a tape cartridge type recording and/or reproducing apparatus which prolongs the life of a motor used therein and reduces noises.

It is yet a further object of the invention to provide a tape driving device for a tape cartridge type recording and/or reproducing apparatus which is inexpensive and small.

The other objects, features and advantages of the present invention will be apparent from the following description taken in conjunction with the accompanying drawing.

DESCRIPTION OF THE PREFERRED EMBODIMENTS

Figure 1:
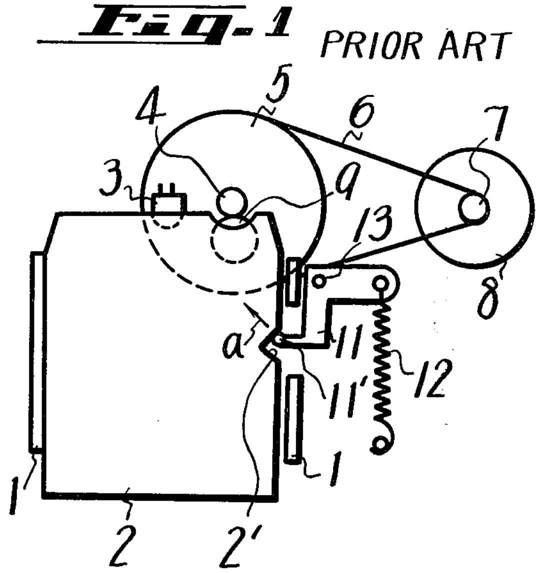
FIG. 1 PRIOR ART
FIG. 1 is a schematic diagram for showing a conventional tape driving device.

Before describing the present invention, an embodiment of the prior art will be described now with reference to FIG. 1. In the figure, reference numeral 1 designates cartridge guides provided on a base plate (not shown) for guiding a magnetic tape cartridge 2 which has housed therein a tape. A magnetic head 3 is mounted adjacent the tape. A capstan 4 is supported by a fly-wheel 5. A belt 6 is stretched between the fly-wheel 5 and a pulley 7 which is attached to the rotary shaft of a driving motor 8. A pinch roller 9 is mounted in the cartridge 2. When the cartridge 2 is loaded in the apparatus and in the operating position shown in FIG. 1, the tape (not shown) housed in the cartridge 2 is driven by the capstan 4 and the pinch roller 9 and is gripped therebetween.

In the prior art apparatus shown in FIG. 1, a tension arm 11 is pivoted at its mid point to the base plate by means of a pin 13. The tension arm 11 is biased in a direction *a* shown in FIG. 1 by a spring 12 which is stretched between one end of the tension arm 11 and the base plate. The tension arm 11 is provided with a roller 11′ at its other end.

With the prior art apparatus shown in FIG. 1, when the cartridge 2 is loaded in the apparatus in the operating position, the roller 11′ engages a V-shaped groove or recess 2′ of the cartridge 2 and by the force of the spring 12 urges the cartridge 2 in such a manner that the pinch roller 9 provided in the cartridge 2 positively contacts the tape and the capstan 4, to drive the tape. Accordingly, the cartridge 2 is moved to the operating position in the apparatus against the weight of the cartridge 2 and the frictional force between the cartridge 2 and the apparatus, and it is required to use a strong spring such as the spring 12 to urge the pinch roller 9 against the capstan 4 by a contact force much higher than that required normally for effectively and positively driving the tape. This results in the power consumption of the motor being increased, and the bearings used therein have a short life span, the noise increases, and the apparatus becomes bulky and expensive.

An embodiment of the present invention, which is free from the drawbacks encountered in the prior art mentioned above, will be now described with reference to FIG. 2 in which reference numerals similar to those of FIG. 1 show similar elements.

In this invention, a lever 10 is pivoted to the base plate at its mid point by a means of a pin 16. The lever 10 has provided at its one end an extension 10′ which may engage with one corner of the V-shaped recess or groove 2′ formed in the sidewall of the cartridge 2. A relatively feeble spring 12*a* is stretched between the fixed part or the base plate (not shown) and the lever 10 to normally bias the latter and its extension 10′ in a direction shown by an arrow $a_1$ in FIG. 2.

In this invention, an arm 14 is provided which is pivoted at its one end to the base plate by means of a pin 13 and rotatably supports the capstan 4 and the fly-wheel 5 at its other end portion. A spring 15 is stretch between the arm 14 and the fixed part to normally bias the arm 14 in a direction shown by an arrow *b* in FIG. 2.

Figure 2:
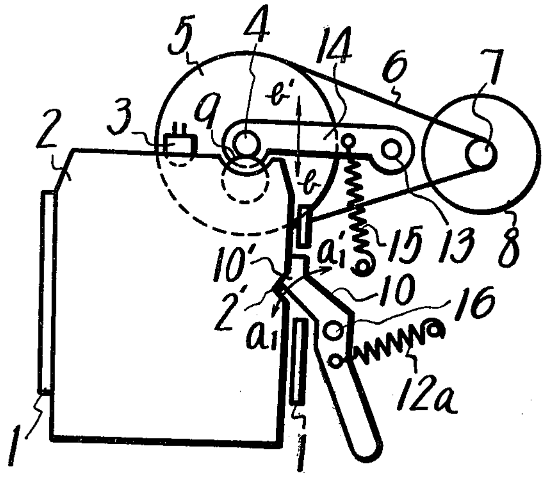
FIG. 2 is a schematic diagram for showing an example of a tape driving device for a tape cartridge type recording and/or reproducing apparatus according to the invention.

With this invention, when the cartridge 2 is loaded in the apparatus to the operating position shown in FIG. 2, the extension 10′ of the lever 10 engages the groove 2′ formed on one side of the cartridge 2 to position the cartridge 2 in an operative position by the spring force of the spring 12*a*, while the capstan 4 supported by the arm 14, which is pivoted on the pin 13 rotates around the pin 13 in the direction of the arrows *b* and *b*′ but normally in the direction *b* by the spring 15. The capstan contacts the tape and the pinch roller 9 provided in the cartridge 2 with gripping force. Thus, the rotation of the motor 8 is transferred through the pulley 7, the belt 6 and the fly-wheel 5 to the capstan 4 to drive the tape gripped between the capstan 4 and the pinch roller 9.

As mentioned above, according to this invention, since the capstan 4 is rotated in the direction of arrows $b$–$b'$, when the cartridge 2 is mounted in the apparatus, the capstan 4 is rotated in the direction $b'$ and the extension 10′ of the lever 10 moves to engage with the groove 2′ of the cartridge 2 to the suitable degree by the spring force of the spring 12$a$ and then the capstan 4 is urged against the pinch roller 9 to grip the tape therebetween by action of the spring 15.

In this invention, the lever 10 and hence the extention 10′ thereof only acts to position the cartridge 2 and it has no action to move the cartridge 2 in the upward direction as in the prior art. Further, the spring 15 acts to only apply a force to the capstan 4 for driving the tape gripped between the capstan 4 and the pinch roller 9. As a result, the gripping force of the capstan 4 and the pinch roller 9 for the tape is reduced to about one-third of that of the prior art, and the required torque of the motor is reduced to about one-half to one-third of that necessary, with the prior art.

Further, the gripping force of the capstan 4 against the tape is reduced as mentioned above because unnecessary force is eliminated. Accordingly, the bearing wears less as compared with the prior art devices which prolongs the life of the motor and noise is reduced to greatly improve the apparatus.

Further, with this invention a small motor is sufficient so that the apparatus can be made at low cost and be small.

In addition, due to the specific lever 10, the cartridge can be easily removed from the apparatus and if automatic removal of the cartridge is desired, a device for this purpose can be operated by a small solenoid, by way of example.

Another embodiment of the present invention will be now described with reference to FIGS. 3, 4 and 5 in which reference numerals same as those of FIGS. 1 and 2 indicate the same elements.

Figure 5:
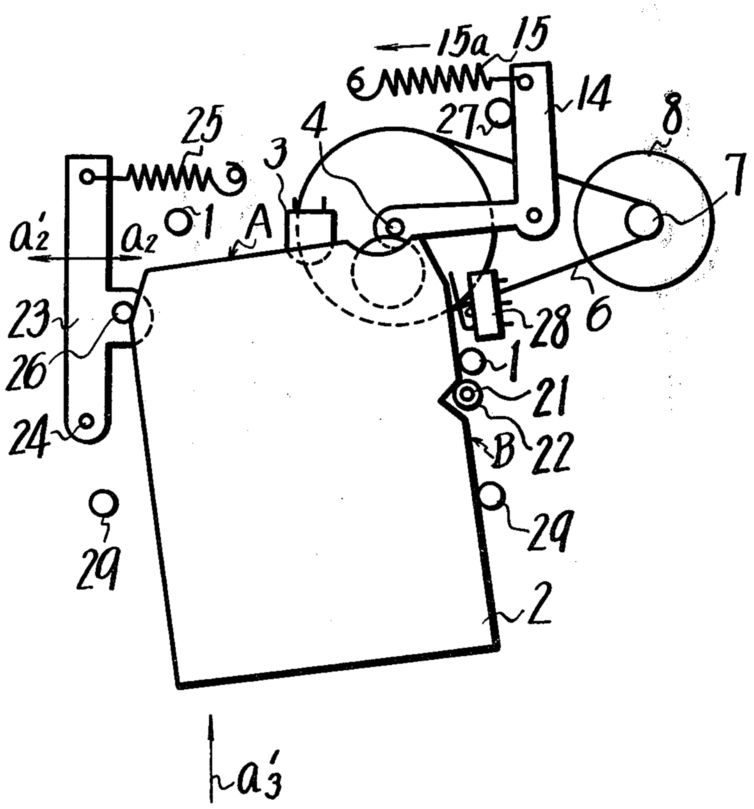
FIGS. 4 and 5 are schematic diagrams of the device shown in FIG. 3 but the tape cartridge is in inoperative position, respectively.
Figure 3:
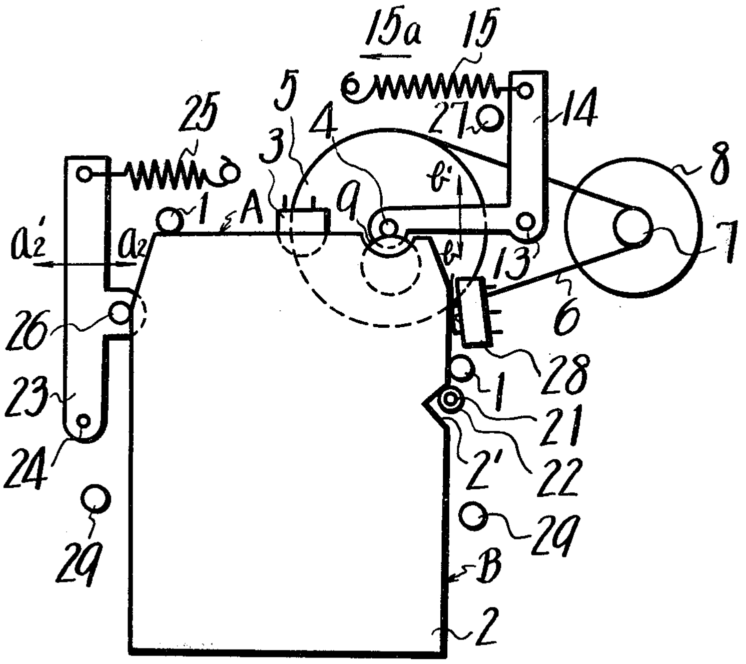
FIG. 3 is a schematic diagram for showing another example of the tape driving device of the invention when the tape cartridge is in operating position.
Figure 4:
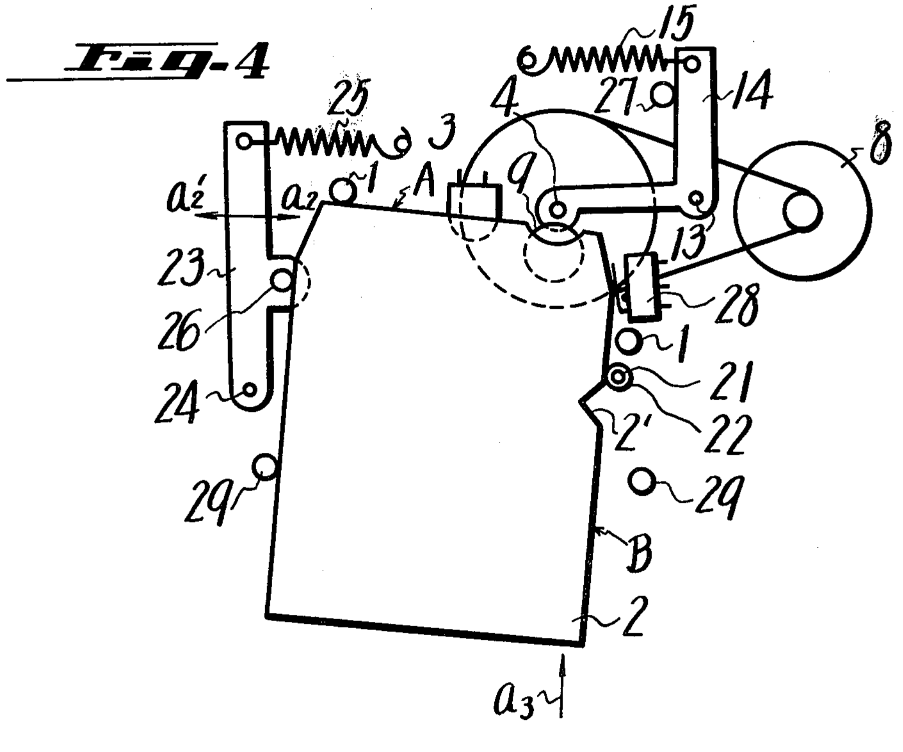

In the drawings, FIG. 3 shows the case where the cartridge 2 is inserted into the apparatus for operation, and FIGS. 4 and 5 show the case where the cartridge 2 is in the inoperative position where tape of the cartridge 2 is not driven by the apparatus.

In the second embodiment a shaft 21 is mounted on the base (not shown) and a roller 22 is rotatably supported by the shaft 21. The shaft 21 is positioned such that the roller 22 may engage the V-shaped groove 2′ of the cartridge 2 when it is loaded and in the operating position in the apparatus as shown in FIG. 3. A lever 23 is pivoted to the base by means of a pin 24 at its one end and is normally biased in a direction $a_2$ as shown in FIGS. 3, 4 and 5 by a spring 25 stretched between the other end of the lever 23 and the stationary part. A knock pin 26 is planted on the lever 23 which urges the one side of the cartridge 2 which does not have a groove by means of the spring 25 which acts on the lever 23.

In the second embodiment, the arm 14 is formed substantially L-shaped and its corner is pivoted by the pin 13 to a fixed part, and the spring 15 is stretched between one end of the arm 14 which does not carry the capstan 4 and the stationary part, so that the end of the arm 14 with the capstan 4 and the fly-wheel 15 is rotatable in the directions $b$–$b'$ about the pin 13. In this case, the spring 15 normally biases the one end of the arm 14 in a direction 15$a$, so that when the cartridge 2 is not inserted in the apparatus to the operative position, the arm 14 is rotated in the direction $b$ in FIG. 3 to the extent that a stop pin 27 mounted on the base engages the arm 14 as shown in FIGS. 4 and 5. When the cartridge 2 is loaded in the apparatus to the operative position as shown in FIG. 3, the stop pin 27 disengages from the arm 14 due to the force of the pinch roller 9 provided in the cartridge 2 which contacts the capstan 4. The capstan 4 is urged against the pinch roller 9 by the spring force of the spring 15 with the tape (not shown) therebetween as shown in FIG. 3.

The operative position of the cartridge 2 is determined by the two guides 1 (in the second example, the first guide pin 1 engages the front side wall A of the cartridge 2 and the second guide pin 1 engages the side wall B of the cartridge 2) and the roller 22 as shown in FIG. 3. In this case, the cartridge 2 is held in its operative position by the force acting on the knock pin 26 by the spring 25 which acts in the direction $a_2$ and the force acting on the capstan 4 from the spring 15 which acts in the direction $b$. When the cartridge 2 is in the operative position as shown in FIG. 3, a micro-switch 28 is closed by the cartridge 2 and this energizes the motor 8, so that the capstan 4 will be rotated to drive the tape with the pinch roller 9.

With the second embodiment, when driving the tape is stopped, this will tilt the cartridge 2 in the apparatus. That is, as shown in FIG. 4, the cartridge 2 will be inclined to the left about the knock pin 26 which is then rotated in the direction $a'_2$ about the pin 24. Thus, the engagement of the V-shaped groove 2′ of the cartridge 2 with the roller 22 is released and the rotation of the cartridge 2 is stopped by a stop 29 provided on the left side of the cartridge 2 which at that time engages one side wall of the cartridge 2. In this state, the micro-switch 28 is opened to stop energization of the motor 8 and hence to stop the driving of the tape.

FIG. 5 shows another example which can occur when driving of the tape in the cartridge 2 is discontinued. The cartridge 2 is inclined to the right about the roller 22. The rotation of the cartridge 2 is stopped when the other side wall B of the cartridge 2 engages with a stop pin 29 provided on the right side of the cartridge 2. The knock pin 26 engages the tapered portion of the cartridge 2 provided at the upper left corner of the cartridge to hold the cartridge 2 at that position positively and the micro-switch 28 is opened to stop the energization of the motor 8 and hence to stop the driving of the tape in the cartridge 2.

As apparent from the foregoing, with the second embodiment, the driving of the tape in the cartridge 2 is stopped merely by inclining the cartridge 2 slightly to the left or right, while if the tape in the cartridge 2 is driven it is enough to push the cartridge 2 in the direction shown by arrows $a_3$ and $a'_3$ in FIGS. 4 and 5, which brings the cartridge 2 to the operating position shown in FIG. 3.

Further, it is, of course, possible to stop the driving of the tape by removing the cartridge from the apparatus.

Also, the cartridge 2 can be easily loaded in the apparatus because the amount of movement of the knock pin is rather small.

I claim as my invention:

1. A tape driving and locking device for a tape cartridge having a V-shaped groove formed on one side thereof and a tape driving opening on the front side with a pinch roll mounted in said cartridge behind said opening, comprising a first pivoted lever with a capstan mounted on one end and moveable to engage the tape between said capstan and said pinch roll, a first spring connected to said first pivotted lever to bias said capstan toward said pinch roll, a second pivotted lever engageable with said cartridge to lock it in the tape driving position, and a second spring engageable with said second pivoted lever to bias it toward said cartridge.

2. A tape driving and locking device according to claim 1 wherein said second pivoted lever has a locking portion receivable in said V-shaped groove of said cartridge.

3. A tape driving and locking device according to claim 2 including a stop means engageable with the side of said cartridge away from said second pivoted lever.

4. A tape driving and locking device according to claim 1 wherein said second pivoted lever has a guide pin which engages the side of said cartridge on the side away from said V-shaped notch and a roller engages said V-shaped notch.

5. A tape driving and locking device according to claim 4 including at least one stop pin mounted to engage the side of the cartridge having a V-shaped groove.

6. A tape driving and locking device according to claim 5 including a pair of guide means mounted on opposite sides of said cartridge and such that when said cartridge is in the operative position said pair of guide means do not engage said cartridge.

* * * * *